April 22, 1952     B. ROZETT     2,594,220
ADAPTER
Filed March 26, 1947     3 Sheets-Sheet 1
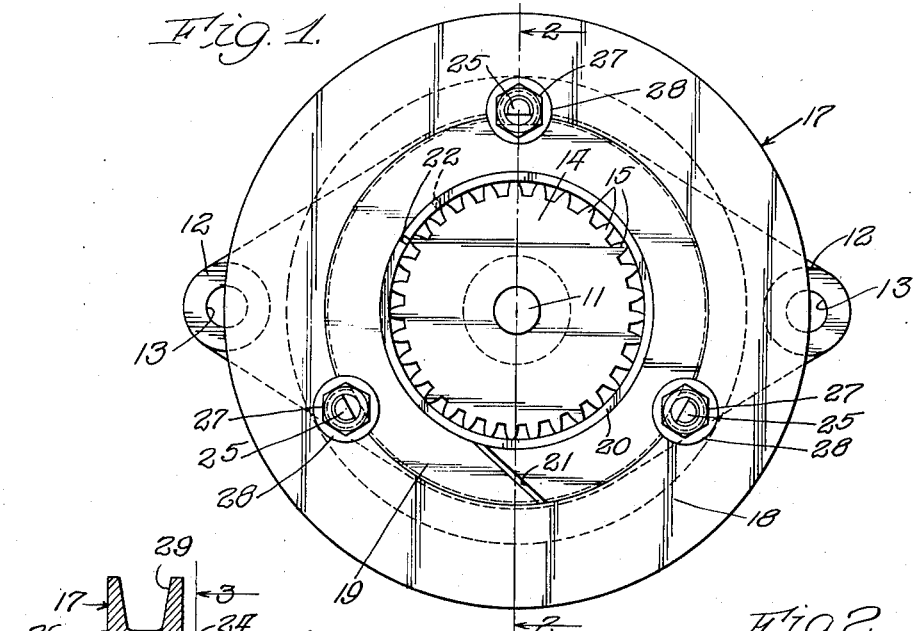
Inventor.
Benjamin Rozett,
By Chritton, Schroeder,
Merriam & Hofgren, Attys.

April 22, 1952 B. ROZETT 2,594,220
ADAPTER
Filed March 26, 1947 3 Sheets-Sheet 2
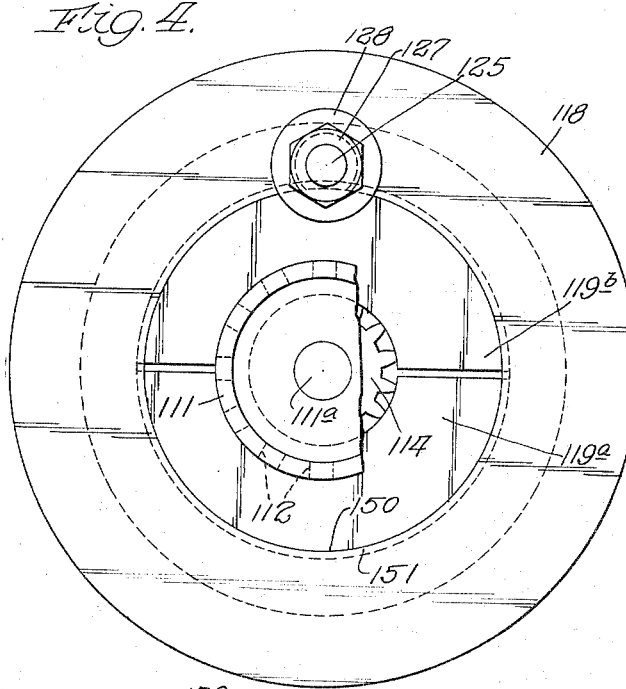
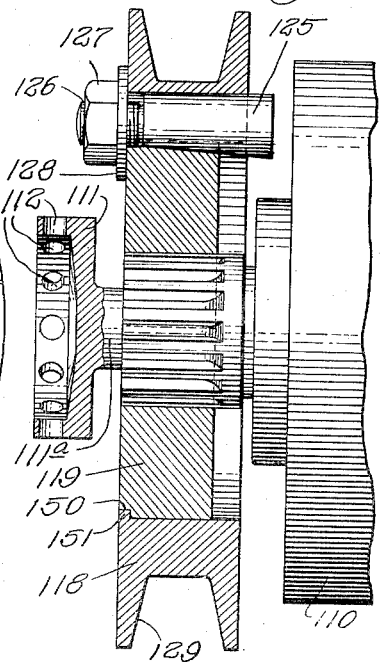
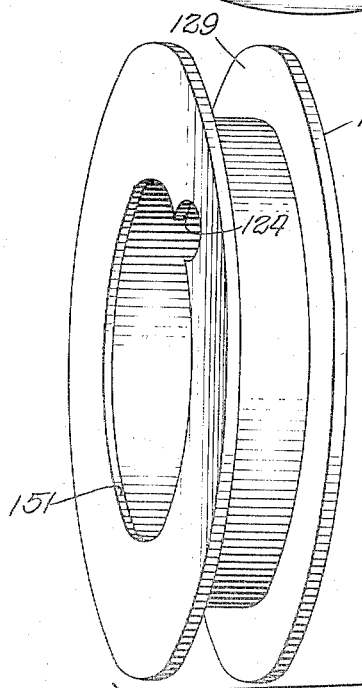
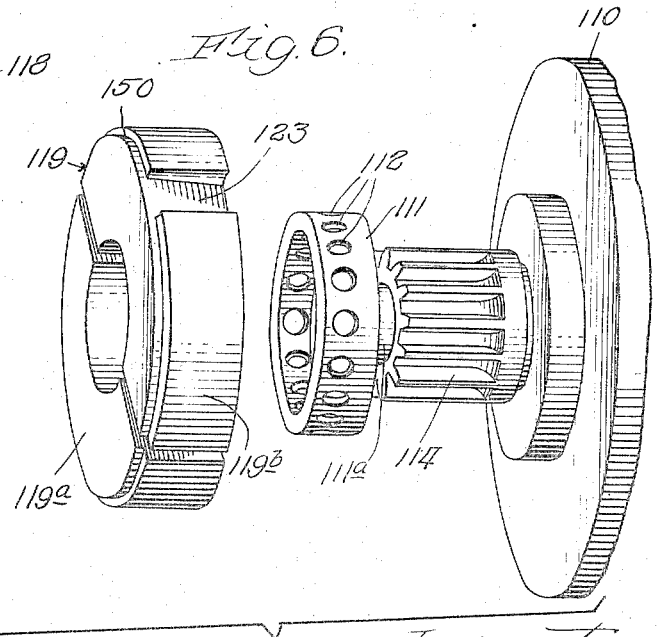
Inventor:
Benjamin Rozett April 22, 1952     B. ROZETT     2,594,220
ADAPTER
Filed March 26, 1947     3 Sheets-Sheet 3
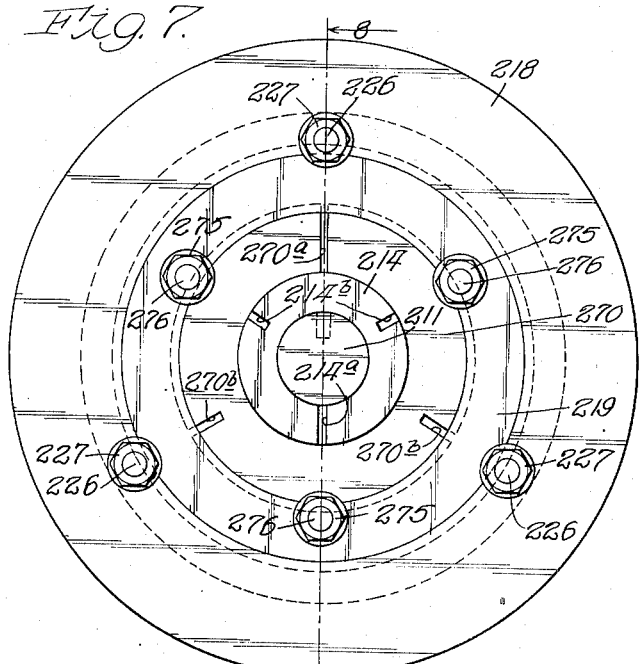
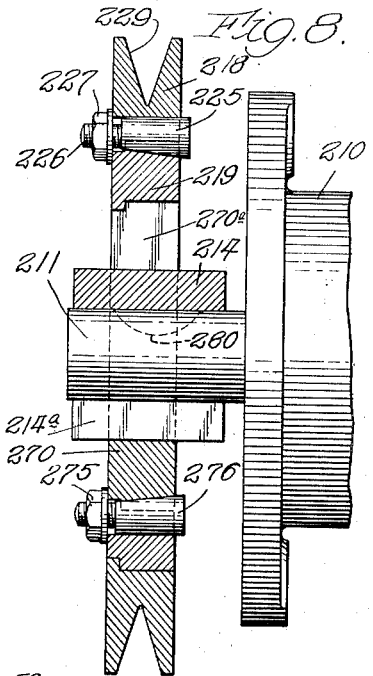
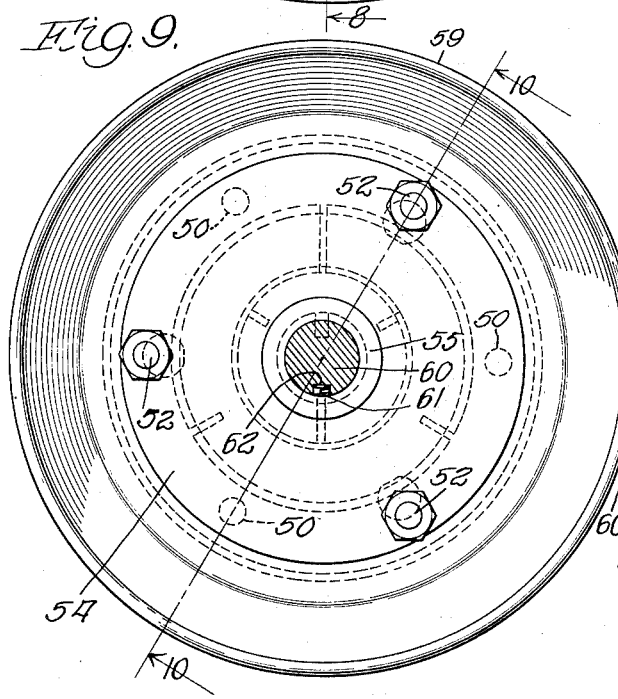
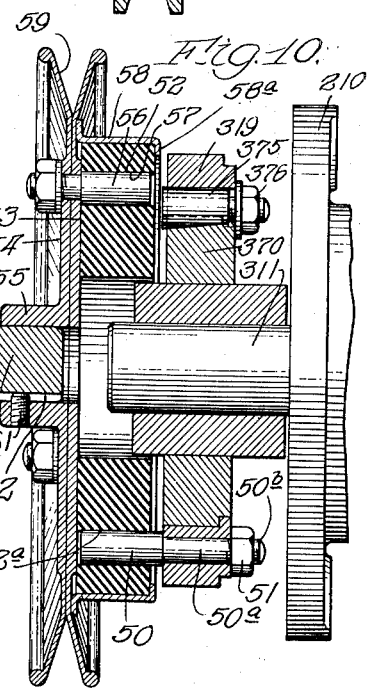

Patented Apr. 22, 1952

2,594,220

UNITED STATES PATENT OFFICE 2,594,220

ADAPTER

Benjamin Rozett, Chicago, Ill., assignor to Joseph Weidenhoff, Incorporated, a corporation of Illinois Application March 26, 1947, Serial No. 737,394

3 Claims. (Cl. 287—52)

This invention relates to an adapter for use on each of a plurality of substantially circular members of various diameters for making a unitary assembly having a desired outer diameter, and relates particularly to such an adapter intended to be used with a power transfer means for either driving one of said circular members or for being driven by said circular member.

One of the features of this invention is that it provides an improved universal adapter for use on each of a plurality of substantially circular non-tapering (i. e., cylindrical) and for tapering (i. e., conical) members of various diameters for making a unitary assembly having a desired outer diameter so that each assembly may be used to drive a circular member or the circular member may be used to drive the assembly; another feature of the invention is that it provides such an adapter having an outer peripheral surface adapted to be engaged by a power transfer means for driving said circular member or being driven by said member; still another feature of the invention is that it provides an adapter for use on each of a plurality of substantially circular members of various diameters with the adapter comprising several internested substantially concentric annular parts, together with improved means for readily and rapidly assembling and disassembling the parts to make a unitary whole including the circular member around which the adapter is to be assembled; yet a further feature of this invention is that it is particularly adapted for belt driving, during testing, generators of the gear-driven type; and another feature of the invention is the provision of improved means for driving the adapter. Other features and advantages of this invention will be apparent in the following description of one embodiment of the invention and the accompanying drawings. Of the drawings:

Fig. 1 is a front elevation of one embodiment of the invention showing the new adapter attached to the gear wheel of a small electric generator; Fig. 2 is a vertical section through the adapter and gear wheel and showing the generator in side elevation; Fig. 3 is a section taken along line 3—3 of Fig. 2; Fig. 4 is a front elevation of a second embodiment of the invention with portions broken away; Fig. 5 is a vertical section through the adapter and gear wheel of Fig. 4 showing the generator in side elevation; Fig. 6 is a perspective exploded view of the adapter and generator of Fig. 4; Fig. 7 is a front elevation of a third embodiment of the invention; Fig. 8 is a vertical section taken along line 8—8 of Fig. 7; Fig. 9 is a front elevation of an improved driving means for rotating the adapter and circular member to which it is attached; and Fig. 10 is a section taken along line 10—10 of Fig. 9.

The new adapter is particularly useful for providing a driving attachment to the drive gears of automotive generators such as are used with internal combustion engines, as in automobiles and other rotating units. In testing the generators, each generator is driven at a predetermined speed and the electrical output of the generator determined. Generators from different types of automotive units, however, have gear wheels and shafts of various diameters so that it is difficult to assemble a given power means with all generators so that each can be driven at a predetermined speed as when such units are under test. The present adapter was designed to overcome this difficulty. In the new adapter an outer annular member may be attached to the gear wheel of any generator to make the unitary assembly; and the annular member may be driven so as to drive the generator gear. This is accomplished by having a plurality of internested and concentric annular members adapted to be arranged between the outer annular member and the gear wheel, together with means for clamping all annular members together and to the gear wheel to make a unitary assembly. If the gear is small, more or different internesting annular members will be required than if the gear wheel is large. These annular members may be easily assembled with the proper number or type of members arranged between the gear wheel and the outer annular member and are held together by cam or wedging means arranged between at least some of the lateral surfaces of the internested annular members.

The invention will be described as related to an adapter for use on generator gears and armature or other shaft extensions. It is believed obvious that this adapter may be used on any substantially circular member to make a unitary whole having a constant outer diameter that can be used either for driving the circular member or for being driven by the circular member.

In the embodiment of the invention shown in Figs. 1 to 3, inclusive, the generator 10 is provided with a shaft 11, mounting flanges 12 having bolt holes 13 therein, and a circular gear 14 on the shaft provided with gear teeth 15 locked to the shaft 11 by means of a key 16. The adapter 17 is shown tightly locked on the gear 14 so as to make a unitary assembly.

The adapter 17 comprises a large solid annular member 18 having an inner diameter considerably larger than the outer diameter of the largest gear 14 upon which the adapter is to be used. Arranged between the outer annular member 18 and the gear 14 are a plurality of internested annular members arranged concentric to each other and to the gear 14. These annular members, as shown, comprise a relatively thick outer member 19 and a relatively thin inner member 20. The outer internested member 19 has an outer diameter normally slightly less than the inner diameter of the large annular member 18. The inner internested member 20 has an outer diameter normally slightly less than the inner diameter of the member 19 and an inner diameter normally slightly greater than the diameter of the gear 14. As shown in the drawings, the thin annular member 20 is arranged around the gear 14; the thick annular member 19 is arranged around the thin member 20 and the outer annular member 18 is arranged around the thick member 19. The thick outer internested annular member 19 is provided with a relatively wide split 21 extending through the member and arranged at any required angle to the diameter of the member. The inner internested member 20 is also provided with a relatively wide split 22 extending through the member and arranged at an angle to the circumference of the member. These splits allow for considerable contraction and expansion of the respective internested members.

In order to clamp all the annular members together and to clamp the inner internested member 20 to the gear 14 (the tips of the teeth of which provide an effective cylindrical surface), the outer internested member 19 is provided with a plurality of depressed surfaces 23 on the outer surface thereof with each surface 23 sloping downwardly from the front to the rear, as shown in Fig. 2. The inner surface of the large outer annular member 18 is provided with a plurality of arched surfaces 24 with each arched surface so located as to be arranged over a depressed surface 23 when the adapter is assembled. Each depressed surface 23 provides a cam surface while the corresponding arched surface 24 holds a cam or lockpin against the cam surface. As shown in the drawings, each cam or wedging means is a bolt 25 having a flattened sloped surface adapted to engage a cam surface 23 with the rest of the bolt being curved to engage the arched surface 24. The small end of each bolt is provided with screw threads 26 around its curved surface with the screw threads being engageable by a nut 27 in order to urge the bolt 25 outwardly, thereby causing it to bear against the cam surface 23 and the arched surface 24. The curved surface on which the screw threads 26 are located extends more than halfway around the circumference of the bolt at this point so that the nut 27 will be held on the bolt. The nut 27 bears against a washer 28.

When the adapter is assembled as shown in the drawings, the bolts 25 act as cams serving to provide outward pressure on the large annular member 18 and inward pressure on the internested members 19 and 20. This causes compression of the members 19 and 20 and serves to bind them together and to bind the inner member 20 on the gear 14, thereby providing a unitary assembly including the gear.

The large outer annular member 18 is provided with an annular groove 29 for engagement with a V-belt through which power may be transmitted to drive the generator shaft 11. It is believed obvious that any other desired power transfer surface may be provided if desired. These include gear teeth, a flat surface for engaging a belt, and the like.

Each of the internested members are split, with the sides of each split being separated from each other when no pressure is applied to the member. This permits substantial contraction of the member. The term "split," therefore, as used herein means that the sides are so divided. If desired, any or all of the internested members may be divided on a diameter or elsewhere to make two or more parts.

In the embodiment shown in Figs. 4 to 6, inclusive, the adapter is capable of use on a generator 110 having an oil slinger ring 111 provided with spaced holes 112 on the periphery thereof, with the diameter of the oil slinger ring being larger than that of the gear 114. The gear is formed integrally with the oil slinger of the generator which in turn is secured to the armature shaft. As shown, it is a press fit thereon.

The adapter comprises a large solid annular member 118 having an inner diameter larger than the outer diameter of the gear 114 and the oil slinger 111. The outer surface of the annular member 118 is provided with a groove 129 which is adapted to be engaged by a V-belt to drive the generator armature. Arranged between the annular member 118 and the gear 114 is a smaller annular member 119. This second annular member 119 is divided into two parts 119a and 119b substantially on a diameter. The two parts are so dimensioned that when they are placed on the gear 114 the adjacent edges of the two parts on the diameter will be slightly separated and the overall diameter of the smaller annular member 119 will be slightly less than the inner diameter of the larger annular member 118, as shown in Fig. 4. By having the smaller annular member 119 in two parts, it may easily be placed on the gear 114 without interference by the oil slinger ring 111.

One part 119b of the smaller annular member 119 is provided with a depressed sloping surface 123 on its outer surface. The inner surface of the larger annular member 118 is provided with a corresponding arched surface 124. The depressed surface 123 provides a cam surface while the arched surface holds a lockpin or bolt 125 against the cam surface. As shown in Fig. 5, the bolt 125 has a flattened sloped surface adapted to engage the cam surface 123 with the rest of the bolt being curved to engage the arched surface 124. The small end of the bolt is provided with screw threads 126 with the screw threads being engageable by a nut 127 in order to urge the bolt 125 outwardly, thereby causing it to bear against the cam surface 123 and the arched surface 124. The nut 127 bears against the washer 128.

In order to aid in holding the assembly in proper alignment, there is provided a right angled groove 150 on the outer edge of the small annular member 119 which is adapted to engage a similarly shaped flange 151 on the inner edge of the large annular member 118.

As can be seen in Fig. 5, the thickness of the small annular member 119 is considerably less than the thickness of the large annular member 118. This provides greater driving surface for the large annular member while enabling the adapter to be assembled on a gear of relatively small thickness.

In the embodiment shown in Figs. 7 and 8 there are provided a large solid annular member 218, a second annular member 219 internested within the first member 218, a third annular member 270 internested within the second annular member 219 and a fourth annular member 214 contacting the shaft 211 that is to be driven. The large solid annular member 218 is provided with a groove 229 on its outer surface so that it can be driven by a belt or the like. The first annular member 218 and the second annular member 219 are locked together by spaced bolts 225 having cam surfaces thereon and nuts 227 engaging threaded ends 226 of the bolts with the bolts having cam surfaces and operating in the same manner as described above. The second annular member 219 and the third annular member 270 are locked together by similar cam bolts 276 and nuts 275. The fourth annular member 214 is compressed by the action of the cam bolts so as to be locked on the shaft 211. The fourth annular member 214 is provided with an arcuate tongue 280 adapted to fit within a similarly shaped groove on the shaft 211 in order that the adapter may be more firmly locked on the shaft.

The third annular member 270 is provided with a relatively wide split 270a in order to permit a substantial degree of contraction when force is applied thereto. This annular member is also provided with two other spaced splits 270b on the outer surface thereof in order to make the member more flexible. These two splits 270b extend less than the thickness of the member. The fourth member 214 is provided with similar splits 214a and 214b which permit flexing of the member 214 in order to position the member on shaft 211 with tongue 280 in its groove (Fig. 8).

In the embodiment shown in Figs. 9 and 10, improved means are provided for driving the adapter assembly. In the form shown, the adapter that is fastened to the shaft 311 is the same as that shown in Figs. 7 and 8 except that the outer annular member 218 is omitted. The second annular member 319 and the third annular member 370 are locked together by the cam bolts 375 and nuts 376. Any other form of adapter may be used if desired.

In this embodiment, the second annular member 319 is provided with laterally projecting pins 50 with each pin having a shank portion 50a of smaller diameter than the rest of the pin and held within a hole on the annular member 319. Each shank portion 50a is provided with a threaded projecting end 50b so that the pin may be held in position by a nut 51. At least two of these pins are provided, but more than two are preferred.

The adapter, shaft 311, and thus the generator 210 are driven by providing a disk 52 of rubber or other resilient material arranged adjacent the adapter and mounted for rotation. The disk is provided with spaced holes 52a in which the pins 50 are held. The rubber disk serves to absorb shocks and provides a more-or-less universal driving means between the joint and adapter. The disk 52 is mounted on a metal backing plate 53 against which is arranged a second backing plate 54 having an annular extension 55 thereon. The rubber disk 52 is held in place on the backing plate 53 by spaced pins 56 bolted to the backing disks 53 and 54 and extending into holes 57 in the rubber disk 52. These pins may be bonded to the rubber by means of a rubber adhesive. The disk is also fastened in place by means of an annular flange 58 extending around the outer surface of the disk and attached to the backing plate 53. This flange 58 has a bent-over portion 58a closely embracing the free edge of the rubbber disk 52.

In the form shown, the backing plates 53 and 54 have their outer edges flared away from each other to provide a groove 59 in order that the assembly may be driven by a belt or the like.

The annular extension 55 on the outer backing plate 54 is locked on shaft 60 by means of a set screw 61 engaging a keyway 62 on the shaft 60. With this construction, the assembly may be rotated either by rotating the shaft 60, or by rotating the backing plates 53 and 54 by means of a belt or the like engaging the groove 59.

Having described my invention as related to one embodiment of the same, it is my intention that the invention be not limited by any of the details of description unless otherwise specified, but rather be construed broadly within its spirit and scope as set out in the accompanying claims.

I claim:

1. A universal adapter for use on each of a plurality of substantially circular members of various diameters for making a unitary assembly having a desired outer diameter, said adapter comprising: an annular member having an inner diameter larger than the diameter of the largest circular member; a plurality of internested substantially concentric annular members with the outer internested member having an outer diameter slightly smaller than the inner diameter of said first annular member and the inner internested member having an inner diameter slightly larger than the diameter of the circular member upon which the adapter is to be used, each of said internested members having a close fit with the members adjacent it and each being provided with a wide split to provide a substantial degree of contraction when force is applied to the outside of the member; a plurality of depressed surfaces extending across the outer surface of the outer internested member with each depressed surface sloping from one end to the other to provide a cam surface; a plurality of arched surfaces on the inner surface of the first annular member with each arched surface adapted to extend over a cam surface; and a bolt held between each cooperating cam surface and arched surface with the bolt having a surface engaging the cam surface for applying pressure simultaneously outwardly against the first annular member and inwardly against the internested members.

2. A universal adapter for use on each of a plurality of substantially circular members of various diameters for making a unitary assembly having a desired outer diameter, said adapter comprising: an annular member having an inner diameter larger than the diameter of the largest circular member; a plurality of internested substantially concentric annular members with the outer internested member having an outer diameter slightly smaller than the inner diameter of said first annular member and the inner internested member having an inner diameter slightly larger than the diameter of the circular member upon which the adapter is to be used, each of said internested members having a close fit with the members adjacent it and each being provided with a wide split to provide a substantial degree of contraction when force is applied to the outside of the member, and the outer internested member being relatively thick and at least the inner internested member being relatively thin; a plurality of depressed surfaces extending across the outer surface sloping from one end to the other to provide a cam surface; a plurality of arched surfaces on the inner surface, each of which is adapted to extend over a cam surface; and a cam means held between each cooperating cam surface and arched surface for applying pressure simultaneously outwardly against the internested members.

3. A universal adapter for use on each of a plurality of substantially circular members of various diameters for rotating the same, said adapter comprising: an annular member having an inner diameter larger than the diameter of the largest circular member and having an outer peripheral surface adapted to be engaged by a power transfer means; a plurality of internested substantially concentric annular members with the outer internested member having an outer diameter slightly smaller than the inner diameter of said first annular member and the inner internested member having an inner diameter slightly larger than the diameter of the circular member upon which the adapter is to be used, each of said internested members having a close fit with the members adjacent it and each being provided with a wide split to provide a substantial degree of contraction when force is applied to the outside of the member, and the outer internested member being relatively thick and at least the inner internested member being relatively thin; a plurality of depressed surfaces extending across the outer surface of the outer internested member with each depressed surface sloping from one end to the other to provide a cam surface; a plurality of arched surfaces on the inner surface of the first annular member with each arched surface adapted to extend over a cam surface; a bolt held between each cooperating cam surface and arched surface with the bolt having a surface adapted to engage the cam surface for applying pressure simultaneously outwardly against the first annular member and inwardly against the internested members when the bolt is urged toward the shallower end of said depressed surface; and means for urging said bolt toward said shallower end.

BENJAMIN ROZETT.

REFERENCES CITED

The following references are of record in the file of this patent:

UNITED STATES PATENTS

| Number | Name | Date |
|---|---|---|
| 611,556 | Blanton, Jr. | Sept. 27, 1898 |
| 1,269,075 | Grabill | June 11, 1918 |
| 1,700,006 | Wallace et al. | Jan. 22, 1929 |

FOREIGN PATENTS

| Number | Country | Date |
|---|---|---|
| 105,155 | Great Britain | of 1917 |